United States Patent [19]

Abe et al.

[11] Patent Number: 4,926,822

[45] Date of Patent: May 22, 1990

[54] CONTROL SYSTEM FOR AN AUTOMOTIVE ENGINE

[75] Inventors: Kunihiro Abe; Masaaki Furuyama, both of Tokyo, Japan

[73] Assignee: Fuji Jukogyo Kabushiki Kaisha, Tokyo, Japan

[21] Appl. No.: 338,731

[22] Filed: Apr. 14, 1989

[30] Foreign Application Priority Data

Apr. 28, 1988 [JP] Japan .................. 63-108673

[51] Int. Cl.$^5$ ............................................. F02D 7/067
[52] U.S. Cl. ................................... 123/414; 123/643
[58] Field of Search ............... 123/414, 643, 617, 476; 73/116, 117.3, 119 A

[56] References Cited

U.S. PATENT DOCUMENTS

| | | | |
|---|---|---|---|
| 4,459,968 | 7/1984 | Brandt et al. | 123/643 |
| 4,519,362 | 5/1985 | Arakawa et al. | 123/414 |
| 4,765,306 | 8/1988 | Scarnera et al. | 123/643 |

FOREIGN PATENT DOCUMENTS 60-27785 2/1985 Japan .
62-290227 11/1987 Japan .

Primary Examiner—Tony M. Argenbright
Attorney, Agent, or Firm—Martin A. Farber

[57] ABSTRACT

Opposite first projections are formed on a crankshaft disk secured to a crankshaft of an engine on diametrically opposite positions, which correspond to top dead centers for specific positions at least two groups in which a pair of cylinders are in opposite phase to each other. A first sensor is provided for sensing the first projections and for producing a crank angle signal. Second projections are formed on a camshaft disk for representing the number of cylinders. A second sensor is provided for sensing the second projections for producing a cam angle signal. A specific cylinder is discriminated by a projection formed on the camshaft disk. In accordance with the crank angle signal and with the cam angle signal, operations for cylinder in each group is controlled at start of the engine. Further, in accordance with the cam angle signal and crank angle signal and with the discrimination of cylinder, the operation for each cylinder is independently controlled.

4 Claims, 5 Drawing Sheets

CONTROL SYSTEM FOR AN AUTOMOTIVE ENGINE

BACKGROUND OF THE INVENTION

The present invention relates to a system for detecting an angular position of crankshaft relative to a specific cylinder of an engine for a motor vehicle, and more particularly to a system for discriminating a specific cylinder and for controlling the engine in accordance with the discriminated cylinder.

Heretofore, various systems for controlling the ignition timing for an internal combustion engine for a motor vehicle have been proposed.

Japanese Patent Application Laid-Open 60-27785 discloses a system in which a camshaft is provided with a cam timing pulley having projections which is securely mounted on a camshaft. A cam angle is detected by sensing the position of the projection with a photosensor, thereby detecting the top dead center on the compression stroke of a cylinder to be controlled. By detecting the cam position relative to the specific cylinder, other cam positions with respect to the other cylinders can be determined.

Japanese Patent Application No. 62-290227 discloses a system in which a sensor is mounted on a crankshaft of an engine for producing a reference crank signal in the form of a pulse and a sensor is mounted on a camshaft for producing a cam signal for detecting the top dead center of a cylinder, so that cylinders can be discriminated, thereby controlling the ignition timing of a corresponding cylinder.

In the former system, the camshaft is connected to the crankshaft by a timing belt so as to be rotated at half speed of the crankshaft. However, it may occur that the camshaft does not synchronize with the crankshaft during a period after the starting of the engine. Consequently, the system does not properly control the ignition timing to fail to start the engine. In the latter system, the crankshaft may not be in synchronism with the camshaft because of tolerances in manufacturing processes. It is necessary to provide a spare time between the reference crank signal and the cylinder discriminating signal.

If a magnetic pickup is used as sensing means, the pulse width and/or the number of the pulses must be expanded for producing an output signal having a sufficient voltage. However, it is difficult to increase the number of pulses in multiple-cylinder engines.

SUMMARY OF THE INVENTION

The object of the present invention is to provide a control system for an engine in which the engine is controlled at accurate timing with a simple structure.

According to the present invention, there is provided a system for controlling an internal combustion engine having even cylinders, comprising a crankshaft disk rotated in synchronism with a crankshaft of the engine, at least two first indicator means formed on the crankshaft disk on diametrically opposite positions, corresponding to particular positions in crank angle for at least two groups in which a pair of cylinders are in opposite phase to each other, a first sensor for sensing the first indicator means and for producing a crank angle signal, a camshaft disk rotated in synchronism with a camshaft of the engine, at least two second indicator means formed on the camshaft disk on diametrically opposite positions, corresponding to particular positions in cam angle for at least two groups in which a pair of cylinders are in opposite phase to each other, a second sensor for sensing the second indicator means and for producing a cam angle signal, third indicator means formed on the camshaft disk for representing a specific cylinder, discriminator means responsive to an output signal of the second sensor when detecting the third indicator means for producing a discriminating signal, control means responsive to the crank angle signal and to the cam angle signal for controlling operations for cylinders in each group, and responsive to the discriminating signal, cam angle signal and crank angle signal for independently controlling the operation for each cylinder.

In an aspect of the invention, the first and second indicator means are projections formed on the periphery of the disks, the particular positions of the first indicator means are the top dead centers in the cylinders.

The other objects and features of this invention will become understood from the following description with reference to the accompanying drawings.

BRIEF DESCRIPTION OF THE PREFERRED EMBODIMENT

DETAILED DESCRIPTION OF THE PREFERRED EMBODIMENTS

Figure 1:
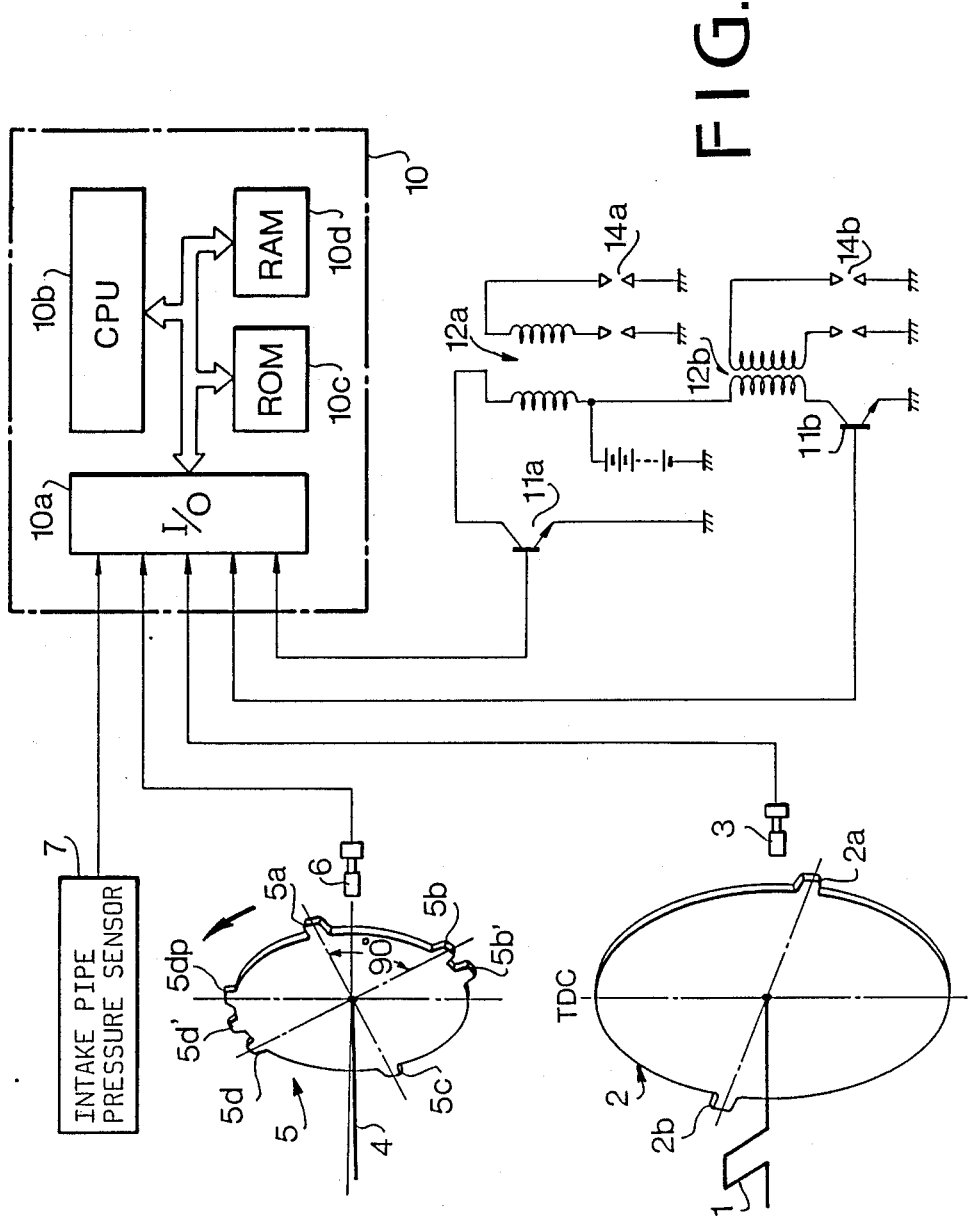
FIG. 1 is a schematic illustration of a system according to the present invention.
Figure 4:
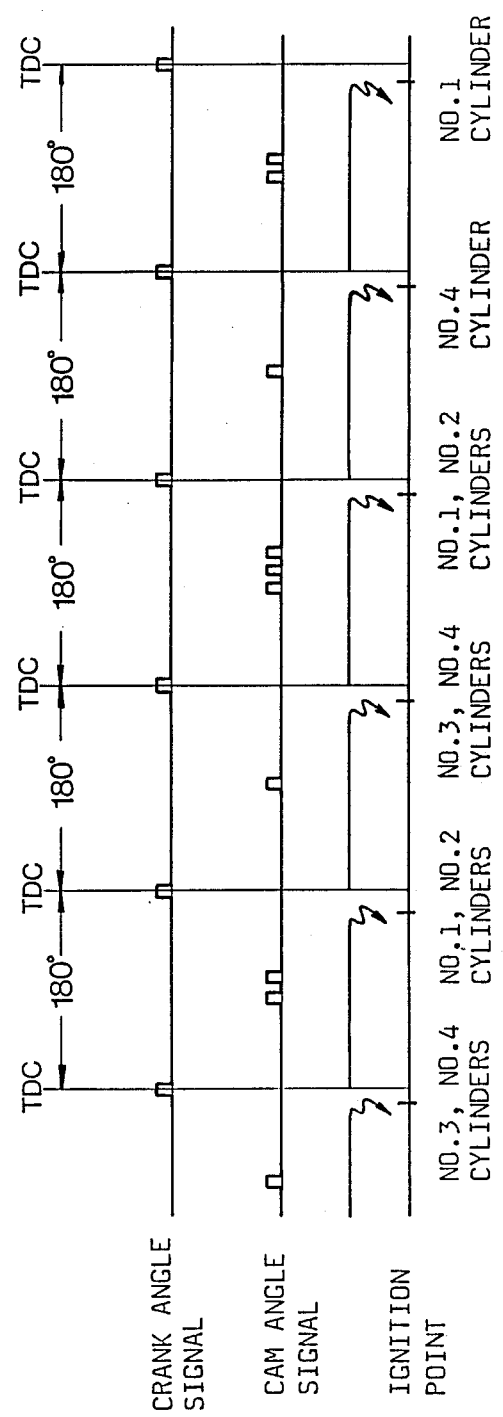
FIG. 4 is a diagram showing an ignition timing in relation to a crank signal and a cam signal.

Referring to FIG. 1 showing a control system for an engine with four cylinders for a motor vehicle according to the present invention, a crankshaft 1 of the engine has a crankshaft disk 2 secured thereto. The four cylinders of the engine can be divided into two groups, one group consists of No. 1 cylinder and No. 2 cylinder, and the other group consists of No. 3 cylinder and No. 4 cylinder, in each group the intake stroke and the exhaust stroke are opposite to each other. In other words, the strokes of both cylinders in each group are in opposite phase (180 degree phase difference). More particularly, when the piston of No. 1 cylinder is at the top dead center, the piston of No. 2 cylinder is also at the top dead center. In order to detect the top dead center of each group, two opposite projections (or slits) 2a and 2b are formed on the outer periphery of the crankshaft disk 2 so as to represent top dead centers of a pair of cylinders in each group. A crank angle sensor 3 is provided adjacent the crankshaft disk 2 for detecting the positions of the projections 2a and 2b when the disk 2 rotates to produce a crank angle signal at the top dead center in the form of pulses as shown in FIG. 4.

A camshaft disk 5 is secured to a camshaft 4 for detecting cam angles. The camshaft 4 rotates once when the crankshaft 1 rotates twice. The camshaft disk 5 is provided with a projection 5a, a pair of projections 5b and 5b', a projection 5c, and three projections 5d, 5d' and 5dp on an outer periphery thereof.

Figure 2:
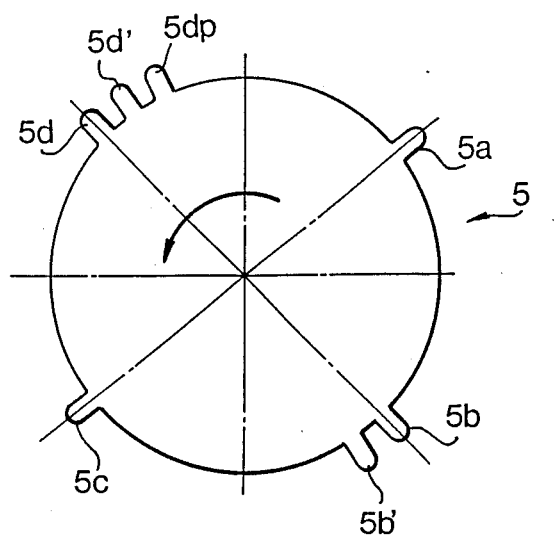
FIG. 2 is a plan view of a camshaft disk.

As shown in FIG. 2 projections 5a, 5b, 5c and 5d are disposed at equal angular intervals (90 degree) and positioned according to the firing order of the cylinder. Namely, the projection 5a represents No. 1 cylinder, projections 5b and 5b' represent No. 3 cylinder, the projection 5c represents No. 2 cylinder and projections 5d and 5d' represent No. 4 cylinder.

Thus, the opposite projections 5a and 5c representing the No. 1 and No. 2 cylinders correspond to one of the above described group and opposite projections 5b, 5b' and 5d, 5d' representing No. 3 and No. 4 cylinders correspond to the other group. The projection 5dp is provided at the rear of the projection 5d' for representing the No. 4 cylinder as a cylinder discriminating signal. A cam angle sensor 6 is provided adjacent the camshaft disk 5 for detecting the projections to produce a cam angle signal representing the igniting order of the cylinder in the form of pulses as shown in FIG. 4.

The crank angle signal and the cam angle signal from sensors 3 and 6 and an intake pipe pressure signal detected by an intake pipe pressure sensor 7 are applied to an electronic control unit 10 comprising a microcomputer. The control unit 10 comprises an input/output interface 10a, a CPU 10b, a ROM 10c for storing control programs, and a RAM 10d for temporarily storing data. An ignition timing is calculated in accordance with a predetermined program and a timing signal is applied to a driver 11a or 11b of each group comprising a power transistor. In accordance with the signals, the driver 11a or 11b is turned off to apply a high-voltage surge to a spark plug 14a or 14b of the corresponding cylinder group with the electric current amplified by an ignition coil 12a or 12b.

When the engine starts, the cam angle sensor 6 detects projections 5a to 5dp of the camshaft disk 5 to produce a pulse signal which is applied to the control unit 10. The number of pulses of the pulse signal is counted by a counter in the control unit 10. When the counter counts one pulse, the No. 1 cylinder or No. 2 cylinder is determined. When the counter counts two pulses, the No. 3 cylinder or No. 4 cylinder is determined. Until the No. 4 cylinder is discriminated, the ignition timings for two cylinders in each group are controlled in accordance with the same crank angle signal representing the top dead center of the both cylinders. When the counter counts three pulses, it means that the projection 5dp for the No. 4 cylinder is detected. Thus, the No. 4 cylinder is determined. After that, other cylinders are discriminated in accordance with the discriminating signal of the No. 4 cylinder, and the ignition timing is independently controlled at every cylinders.

Figure 5:
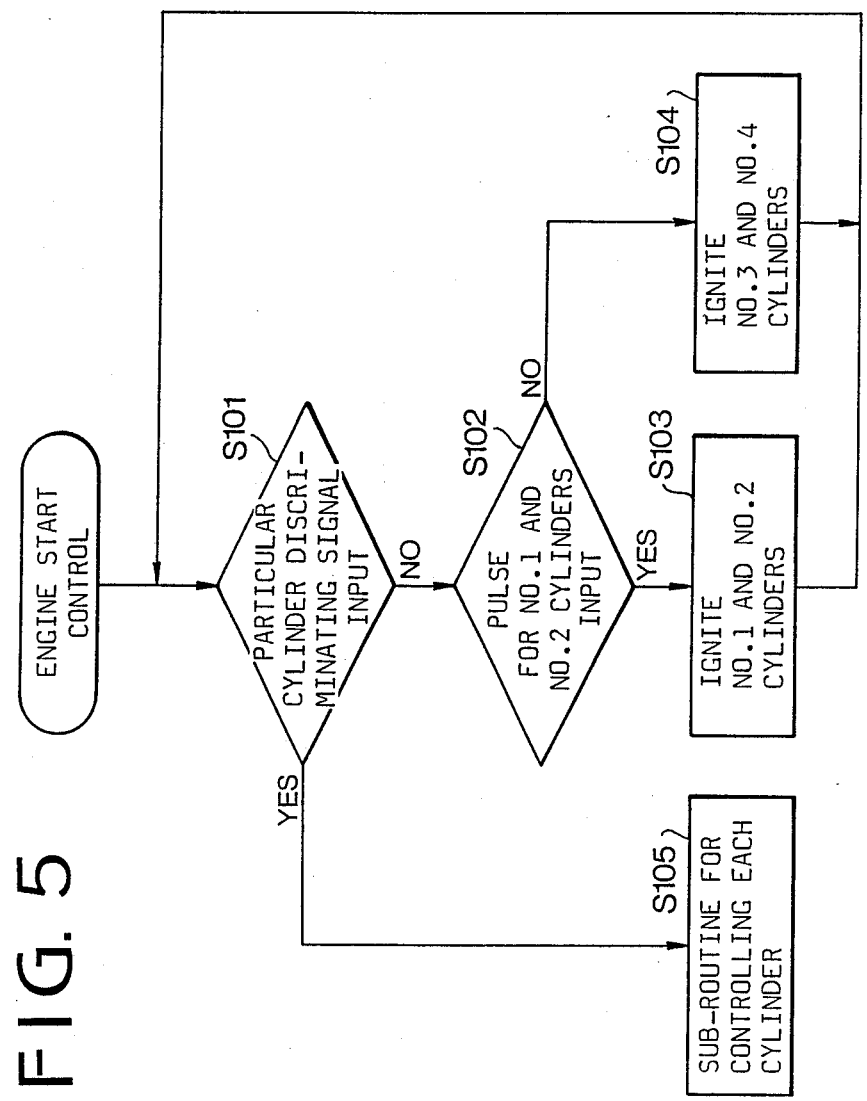
FIGS. 5 and 6 are flowcharts showing operations of the system.
Figure 6:
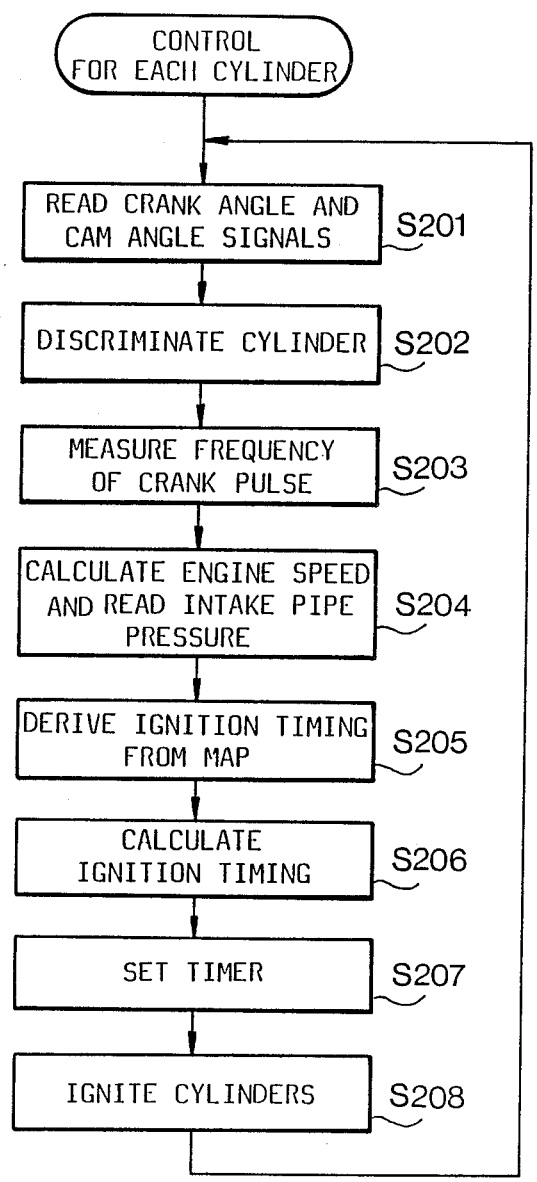

Explaining the operation of the system with reference to flowcharts of FIGS. 5 and 6, at the starting of the engine, a sub-routine operation is performed as shown in the flowchart of FIG. 5. At a step S101, pulse signals from the crank angle sensor 3 and the cam angle sensor 6 are read and it is determined whether the discriminating signal dependent on projection 5dp is detected or not. Namely, if two pulses are counted by the counter and the discriminating signal is not detected by the cam angle sensor 6, the program goes to a step S102 where it is determined that the counter counts one pulse or not. If the cam angle sensor 6 detects the projection 5a or 5c, the counter counts one pulse and the group consisting of the No. 1 and No. 2 cylinder is discriminated. The program proceeds to a step S103 where ignition timing signals are generated for the No. 1 and No. 2 cylinder. The ignition timing is controlled in accordance with the time of the basic position for example, top dead center detected by the crank angle sensor 3 and the ignition operation for the spark plug is performed. The program returns to step S101.

However, at step S102, if two pulses are counted, it means that the cam angle sensor 6 detects projections 5b, 5b' or 5d, 5d' so that the group of No. 3 and No. 4 cylinders is discriminated. The program proceeds to a step S104 where the ignition timing signals are generated for No. 3 and No. 4 cylinder. The program returns to step S101.

If the counter counts three pulses at step S101, it means that the cam angle sensor 6 detects the projection 5dp. The program goes to a step S105 where ignition timing is independently controlled at each cylinder.

Referring to FIG. 6 showing the operation after discrimination of cylinders, pulse signals from sensors 3 and 6 are read at a step S201. At a step S202, the cylinders are discriminated. At a step S203, pulse-repetition frequency is measured. At a step S204, the engine speed is calculated and the intake pipe pressure is read. At a step S205, an ignition angle is derived from a map in accordance with the signals obtained at the step S204. At a step S206, ignition timing is calculated. At a step S207, the ignition timing is set in a timer. At a step S208, ignition voltage is applied to th spark plug of a corresponding cylinder of the group.

Figure 3:
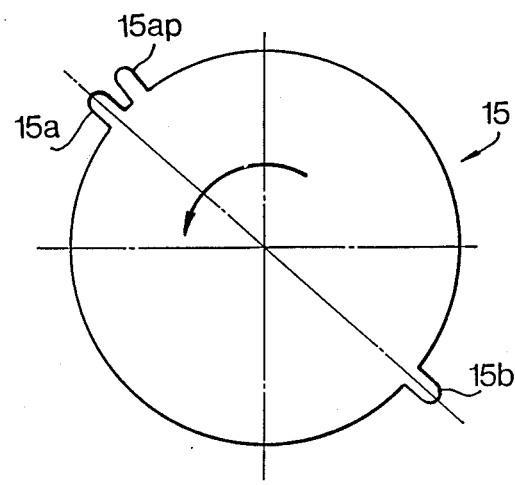
FIG. 3 is a plan view showing a modification of the camshaft disk.

FIG. 3 shows a modification of the camshaft disk 5. A camshaft disk 15 has a projection 15a representing No. 3 cylinder and a projection 15b representing No. 4 cylinder formed on an outer periphery thereof at equal angular intervals (180 degree). A projection 15ap is provided at the rear of the projection 15a for discriminating the No. 3 cylinder. By such a disk having opposite projections, the cylinders can be discriminated.

In the described embodiments, although projections are formed on disks secured to the crankshaft and the camshaft, projections can be formed on the crankshaft, camshaft, or other rotors rotated in synchronism with the crankshaft.

The system can be used for controlling fuel injection of the engine.

In accordance with the present invention, a pair of cylinders of opposite phase to each other are controlled in accordance with a single signal at the starting of the engine. When a specific cylinder is detected, each cylinder is independently controlled. Accordingly, the engine is smoothly started. Since the number of projections on the camshaft disk for discriminating the cylinder is small, the intervals between projections can be expanded. Thus, the discrimination of the cylinders can be achieved with accuracy.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for controlling an internal combustion engine having even cylinders, comprising:
   a crankshaft disk rotated in synchronism with a crankshaft of said engine;
   at least two first indicator means formed on said crankshaft disk on diametrically opposite positions, corresponding to specific positions in crank angle;
   a first sensor for sensing said first indicator means and for producing a crank angle signal;

a camshaft disk rotated in synchronism with a camshaft of said engine;

at least two second indicator means formed on said camshaft disk on diametrically opposite positions, corresponding to specific positions in cam angle for at least two groups in which a pair of cylinders are in opposite phase to each other;

a second sensor for sensing said second indicator means and for producing a cam angle signal;

third indicator means formed on said camshaft disk for representing a specific cylinder;

discriminator means responsive to an output signal of said second sensor when detecting said third indicator means for producing a discriminating signal;

control means responsive to said crank angle signal and to said cam angle signal for controlling operations for the cylinder in each group, and responsive to said discriminating signal, said cam angle signal and said crank angle signal for independently controlling the operation for each cylinder.

2. The system according to claim 1, wherein said first and second indicator means are projections formed on a periphery of said disks, respectively.

3. The system according to claim 1, wherein said operation for each cylinder is ignition timing control.

4. The system according to claim 1, wherein said specific positions of said first indicator means are top dead centers of a piston stroke.

* * * * *